July 4, 1950
P. MOLS
2,513,732
INSTALLATION FOR THE CONTINUOUS
MANUFACTURE OF GLASS
Filed Nov. 29, 1945
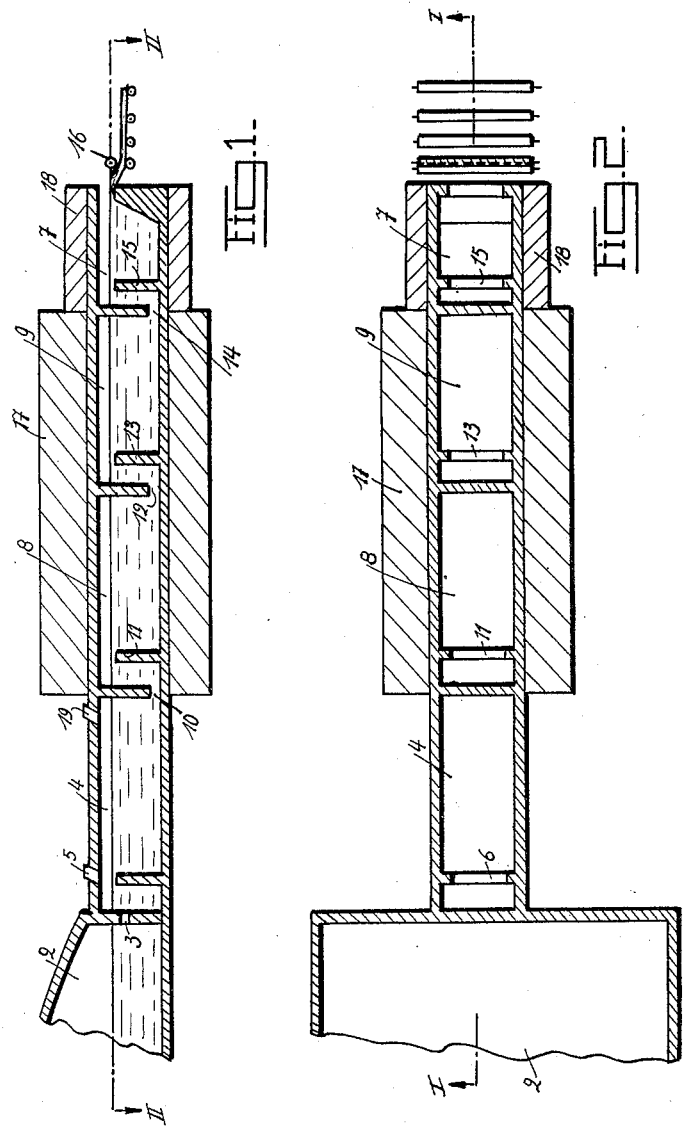
Inventor:
Paul Mols
By G. F. Wordworth
Atty Patented July 4, 1950

2,513,732

UNITED STATES PATENT OFFICE 2,513,732

INSTALLATION FOR THE CONTINUOUS MANUFACTURE OF GLASS

Paul Mols, Boitsfort, Belgium

Application November 29, 1945, Serial No. 631,717
In Belgium December 6, 1944

1 Claim. (Cl. 49—54)

The present invention relates to an installation for the continuous manufacture of glass comprising a smelting furnace in communication with a refining pan in which the glass, proceeding towards a working chamber, is heated and leaves the said refining pan through the bottom of the latter.

There are well-known installations of this type in which the refining pan, at the same time serving the purpose of cooling down the glass, is in communication with the smelting furnace by an overfall or a sill provided in one of the walls of the said furnace.

The said installations were conceived with the object of eliminating thermal currents between the smelting furnace and the cooling and refining pan. In the present patent by "thermal currents" must be understood the convection currents of the glass caused by differences of temperature, on the one hand, due to the cooling of the walls and, on the other hand, arising from the thermal working conditions peculiar to each one of the regions in which smelting, refining, cooling down and working of the glass are carried out.

The foregoing known installations have not given satisfactory results because, if the cooling down and refining pan were of a sufficient size to yield glass of good quality, the thermal currents produced in it would still be considerable whereas if the said pan were of limited size and/or were provided with means for rapid cooling to bring the glass to a viscosity counteracting thermal currents, the glass yielded would not be very pure.

The purpose of the present invention is to remedy these disadvantages.

For this purpose, in the installation according to the invention, there is arranged between the refining pan and the work chamber at least one cooling down compartment the length of which is such that the thermal currents therein remain weak by reason of a small difference of temperature between its inlet and its outlet.

The number of cooling down compartments traversed in series by the glass proceeding from the refining pan towards the working chamber depends upon the difference between the refining and working temperatures, upon the output of the installation, upon the transverse section of the said compartments and upon the thermal insulation of the latter.

Preferably, in the case of several cooling down compartments being traversed in series by the glass proceeding from the refining pan towards the working chamber, the communication opening between any one of the said cooling down compartments and the following one is formed by the lower part of the first compartment considered and a barrier forming a sill or overfall is fixed in each compartment near the inlet of the latter.

The arrangement of the communications between the various cooling compartments at the lower part of the latter and that of a barrier of the aforesaid type near the inlet is intended definitely to avoid the formation of currents between the various compartments.

Moreover, drawing off the glass from each cooling down compartment through the lower part of the latter has the effect of sending into the next compartment the coolest glass from the first compartment, the coolest glass having accumulated in the bottom of the latter compartment by reason of its greater density.

According to another useful feature the various cooling down compartments are heat-insulated. During the slow cooling which results therefrom, the gaseous bubbles which, in spite of all, remain in the mass of the glass at the end of refinement, redissolve in time partly in the glass surrounding them and, therefore their volume, already having undergone contraction due to cooling, diminishes even more.

It is also possible to obtain with a series of cooling down compartments, the volume of which represents only a fraction of the daily output, a glass as pure as in the pans generally used in which the slow and progressive cooling is due to large masses of glass as well as to the thermal currents which bring constantly hotter glass to the said masses.

By virtue of another feature of the invention, the refining pan is in communication with several cooling down compartments fed in parallel. Thus, by means of a single installation, finished glass may be supplied to working members functioning at different temperatures or not requiring glass of the same purity.

The invention also relates to an installation which differs from the known types of installation hereinbefore mentioned by certain features relative to the refining of the glass.

In the installation according to the invention, a barrier forming a sill or overfall is arranged near the inlet of the refining pan at such a level that the glass may be constrained to pass over it as a thin layer in order to proceed towards the working chamber.

Preferably, the heating of the glass is effected by the atmosphere which rises above the barrier placed at the inlet of the refining pan. By its passage as a thin layer over this barrier and by its being heated by means of the atmosphere rising above it, the glass to be refined is brought certainly and in a small volume to the refining temperature over the whole thickness of the said layer. As it is so much hotter than near the surface of the bath, the resistance to the rising of the bubbles, which begin to be liberated from the upper level of the barrier, decreases towards the top.

After passing the abovesaid barrier, the glass may immediately start to cool while proceeding to the working chamber. The liberation of the bubbles, which takes place easily from the time of passing over the barrier due to the steps taken to carry out refining, contributes, with the cooling, to causing the glass to descend to the bottom of the refining pan whence it may be advantageously withdrawn according to the invention.

According to another feature of the installation according to the invention, communication between the smelting furnace and the refining pan is arranged below the level of the region disturbed by the casting in the smelting furnace.

By virtue of this feature, only the purest glass in the smelting furnace is introduced into the refining pan. This glass is cooler than that which is found at the surface of the bath in the said furnace and which could have been discharged through an overfall but is reheated by the hot atmosphere of the refining pan during the whole of the time of its rising from the communication opening between the smelting furnace and the refining pan as far as the upper level of the fixed barrier provided near the said opening.

Other features and details of the invention will appear in the course of the description of the drawings accompanying the present specification, which represent diagrammatically, and by way of example only, one form of construction of an installation according to the invention.

Figure 1 is a vertical section through a plane denoted by the line I—I of Figure 2.

Figure 2 is a horizontal section through a plane denoted by the line II—II of Figure 1.

The installation shown in the drawings comprises a smelting furnace one part of which is shown at 2. By an opening 3 arranged below the region disturbed by the casting of the glass, the said furnace is in communication with a refining pan 4 in which the heating of the glass to be refined is effected by the atmosphere which is above the bath. The atmosphere above the glass bath is, for example, heated by a gas burner 5 arranged above a fixed barrier 6 situated near the inlet of the refining pan, that is to say near the opening 3. The upper level of the barrier 6 is such that the glass is constrained to pass over it as a thin layer, for example roughly ten to twenty centimetres thickness, in order to proceed towards a working chamber 7 by passing at first through cooling down compartments 8 and 9. The thickness of the said barrier is chosen as a function of the time during which the glass must be heated as a thin layer in order to permit of refining.

The refining pan 4 communicates with the first cooling down compartment 8 by an opening 10 arranged at its lower part and a barrier 11 is placed at the inlet of the said compartment. Similarly, the first cooling down compartment 8 communicates with the second cooling down compartment 9 by an opening 12 arranged at its lower part and a barrier 13 is placed at the inlet of the latter compartment. In the same way, communication between the compartment 9 and the working chamber 7 is established by an opening 14 at the lower part of the said compartment, facing which is placed a barrier 15 in the working chamber. From the latter, the glass flows towards a working device 16 shown in the form of a rolling mill.

The cooling down compartments 8 and 9 are surrounded by a heat-insulating jacket 17 and the working chamber 7 is surrounded by a heat-insulating jacket 18.

Each of the barriers or baffles 6, 11, 13 and 15 can serve as either a sill or a weir according to whether the level of the glass bath directly after it is higher or lower respectively than that of the baffle itself.

In the case of a barrier serving as a sill, the thickness of the layer of glass which passes above it depends, therefore, not only upon the upper level of the barrier, but also upon the level of the glass bath directly after it, whereas in the case of a barrier serving as an overfall, the thickness of the glass layer which passes over it depends not only upon the upper level of the barrier but also on the level of the glass directly before it.

Due to the fact that communication between the smelting furnace 2 and the refining pan 4 is established below the level of the region disturbed by the casting of the glass, the surface glass in the furnace cannot penetrate into the refining pan. The glass which does penetrate into the latter is cooler than the aforesaid surface glass but the burner 5 reheats it while it rises and during its passages over the barrier 6. Preferably, it should be so arranged that the glass layer on the barrier may be sufficiently thin in order that, under the effect of heating by radiation coming from the burner 5, the glass may substantially be completely refined when it leaves the barrier. It must, however, be noted that refining may be continued during the whole of the time during which the glass is proceeding as a surface layer towards the cooling down compartment 8, by means of a burner 19 placed in the arch near the end opposite to that in which the burner 5 is found, the said burner 19 maintaining the temperature required for carrying out the refining.

The different parts of the mass of glass to be refined appear successively in rising between the furnace 2 and the barrier 6. The glass is, therefore, strongly reheated when it passes over the said barrier. The distance through which the bubbles have to travel to be freed when the glass passes over the barrier is reduced to a very low value while the glass layer through which they must pass is maintained in a very fluid state by the heat from the burner 5. As the glass is heated from above, its fluid state is increased from bottom to top, thus assisting the bubbles to rise. The same result would be obtained in combination with a barrier such as 6 if heating from the top, instead of being carried out by a burner, were effected by means of electrical resistances above the glass, or in the dome of the furnace, or by a current of hot gases.

As the refining is almost finished after the glass has passed over the barrier 6 as a thin layer, the volume of the glass bath in the refining pan may be reduced, thus enabling the horizontal section, as well as the vertical transverse section of the pan to be reduced. Consequently, the risk of thermal currents forming in the refining pan is reduced.

While refining progresses, the glass, due to its increase of density, descends into the refining pan in order to flow through the lower opening 10 into the cooling down compartment 8, towards the upper part of which it is constrained to rise by the adjacent barrier 11. The length of the said compartment is determined in such a way as to limit the difference of temperature between its ends and to reduce thermal currents. The same applies to the cooling down compartment 9. The number of cooling down compartments depends upon the difference between the temperatures of refining and of working, upon the output of the installation, upon the cross-section of the compartments and upon thermal insulation of the latter.

The arrangement of a very effective heat-insulating jacket 17 around the compartments 8 and 9 ensures a slow cooling of the glass. Consequently, the gaseous bubbles which, in spite of all, remain in the mass at the end of refining, are in time partly redissolved in the glass surrounding them; their volume, having already undergone contraction due to cooling, are reduced even more.

Thus, by means of cooling down compartments the volume of which represents only a fraction of the daily output, it is possible to obtain a glass as pure as in pans generally used in which slow and progressive cooling is due to largeness of the masses of glass as well as to convection currents which continually bring hotter glass to the said masses.

The refining pan 4 could also feed two or more cooling down compartments delivering, in parallel, finished glass to separate working chambers. Such an arrangement would, for example, be chosen when the working members would have to operate at different temperatures or deal with different qualities of glass.

Obviously, the invention is not confined to the form of construction shown, and modifications could be made in the shape, the arrangement and the constitution of certain elements coming into its construction, provided that these modifications may not conflict with the subject of the following claim.

For example, it is obvious that the glass to be refined could be heated just as well by passing an electric current through the mass of the glass, especially in the part of the mess of glass which rises from the opening 3 to the top of the barrier 6.

It is also obvious that the refining pan 4 could be heat-insulated provided that the resistance of the refractory materials may not be impaired.

What I claim is:

An installation for the continuous manufacture of glass comprising a smelting furnace, a refining pan, slowly cooling compartments, a working chamber, separating walls between said furnace, pan, compartments and working chamber, extending from the roof thereof into the glass for creating individual atmospheres, communication passages between said furnace and pan, between said pan and the first slowly cooling compartment, between the successive slowly cooling compartments and between the last slowly cooling compartment and the working chamber, said communication passages between the refining pan and the first slowly cooling compartment, between the successive slowly cooling compartments and between the last of these compartments and the working chamber being situated at the lower part of the corresponding separating wall, and a fixed weir near said communication passages in each of said slowly cooling compartments and said working chamber.

PAUL MOLS.

REFERENCES CITED

The following references are of record in the file of this patent:

UNITED STATES PATENTS

| Number | Name | Date |
|---|---|---|
| 1,598,307 | Pike | Aug. 31, 1926 |
| 1,953,023 | Mulholland | Mar. 27, 1934 |
| 2,049,600 | Wright | Aug. 4, 1936 |
| 2,127,087 | Mulholland | Aug. 16, 1938 |
| 2,139,911 | Peiler et al. | Dec. 13, 1938 |
| 2,413,037 | De Voe | Dec. 24, 1946 |